United States Patent [19]

Cline

[11] 4,262,321
[45] Apr. 14, 1981

[54] AIRCRAFT STATIC DISCHARGER AND MOUNTING BASE THEREFOR

[75] Inventor: Jay D. Cline, Fort Lauderdale, Fla.

[73] Assignee: Dayton-Granger, Inc.

[21] Appl. No.: 79,026

[22] Filed: Sep. 26, 1979

[51] Int. Cl.³ .......................... H05F 1/00; H05F 3/00
[52] U.S. Cl. .................................... 361/218; 361/223
[58] Field of Search ............... 361/212, 216, 217, 218, 361/220, 222

[56] References Cited

U.S. PATENT DOCUMENTS

| 3,170,087 | 2/1965 | Tanner et al. | 361/218 X |
| 3,286,141 | 11/1966 | Raglin | 361/218 |
| 3,558,976 | 1/1971 | Miller | 361/218 X |
| 3,579,033 | 5/1971 | Phillips | 361/218 X |
| 3,628,090 | 12/1971 | McLain | 361/218 X |
| 3,906,308 | 9/1975 | Amason et al. | 361/218 |
| 3,989,984 | 11/1976 | Amason | 361/218 |
| 4,080,643 | 3/1978 | Cline | 361/218 |

Primary Examiner—Harry E. Moose, Jr.
Attorney, Agent, or Firm—Biebel, French & Nauman

[57] ABSTRACT

An aircraft static discharger and mounting structure therefor is disclosed formed of non-metallic conductive material, such as carbon filled nylon, for mounting an aircraft static discharger onto a graphite and/or boron composite aircraft skin. The discharger includes a mounting structure formed as a sub-base having a lower surface provided with downwardly extending conical projections terminating in points which engage the underlying graphite composite surface and form electrical contact therewith, providing for the mounting of the sub-base to the composite surface by conventional non-conductive epoxy. A surface conductive to lightning currents is provided by bonding powdered aluminum to the outer surfaces of the discharger base and the sub-base which, together form a lightning diverter strip formed on the discharger, transfer lightning currents over the surface of the base and sub-base to the underlying aircraft structure.

7 Claims, 6 Drawing Figures

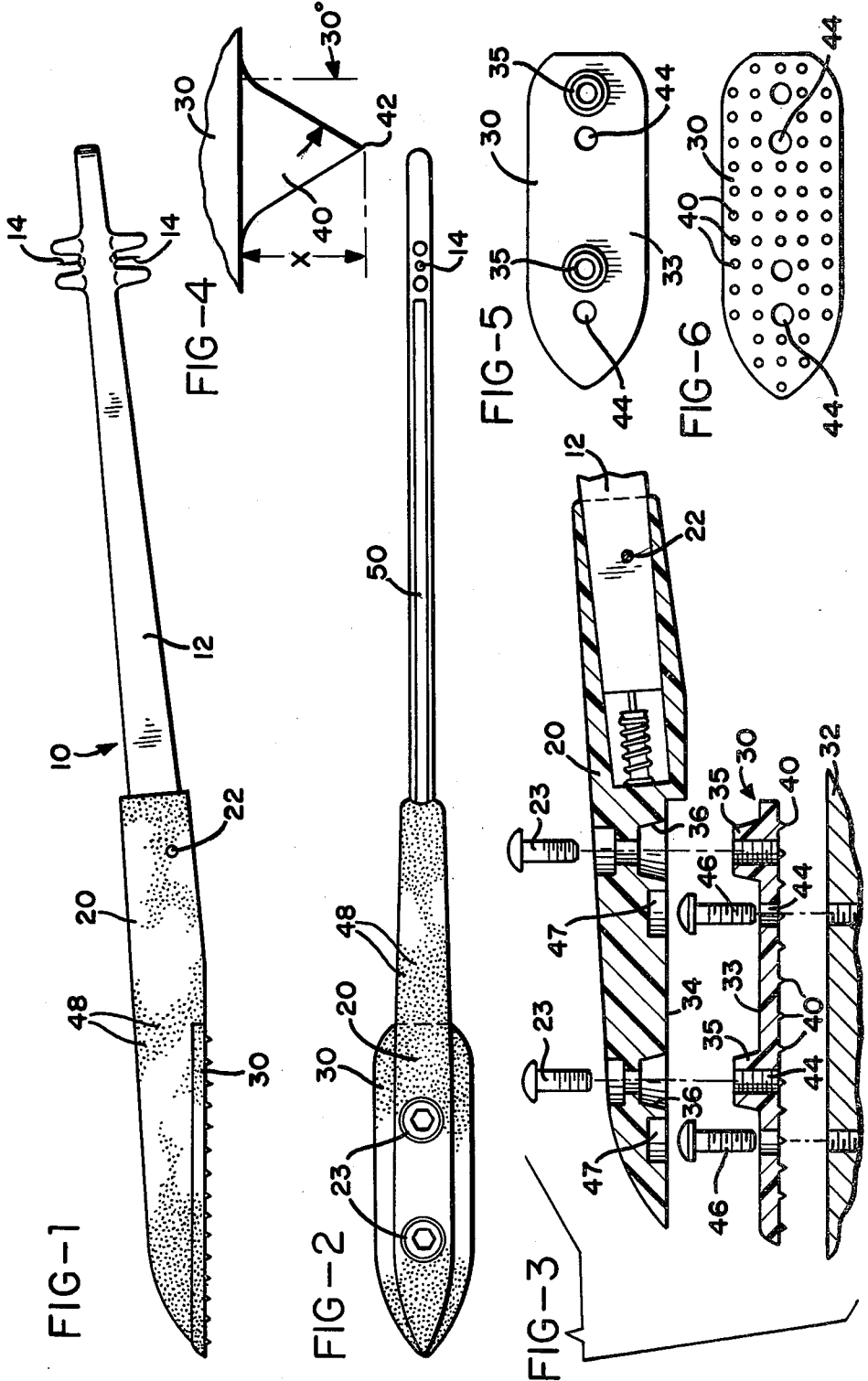

AIRCRAFT STATIC DISCHARGER AND MOUNTING BASE THEREFOR

BACKGROUND OF THE INVENTION

Static dischargers have been successfully made and used in accordance with the patent of Cline, U.S. Pat. No. 4,080,643 issued Mar. 21, 1978. Such dischargers commonly use and employ a metallic base, such as one made of aluminum, which in turn is removably supported and mounted on a discharger support base or mounting structure as shown in the patent of Raglin, U.S. Pat. No. 3,286,141 issued Nov. 15, 1966. Such discharger mounting bases are similarly formed of aluminum.

In recent years there has been a trend in higher performance aircraft to employ aircraft skin surfaces formed of graphite and/or boron epoxy composite material, on the trailing edges of the wing and the control surfaces, and even for the entire wing structure. When conventional static dischargers or their metal mounting bases are mounted on the various trailing edges of these aircrafts, there is an incompatibility of the aluminum of the base structure with the graphite composite material of the aircraft skin, thereby resulting in corrosion of the aluminum base. This corrosion primarily manifests itself at the lower attaching surfaces of the aluminum mounting bases, thereby resulting in a requirement to replace such bases frequently to maintain the proper operation of the static discharger.

SUMMARY OF THE INVENTION

The present invention comprises a static discharger having a mounting structure including a base formed of a conductive non-metallic material, such as a carbon filled nylon. The invention further utilizes a discharger mounting device, identified herein as a sub-base, between the discharger base and the aircraft skin which is compatible with the composite material of the aircraft on which it is to be mounted. Preferably, the sub-base is formed of the same conductive non-metallic material as that of the discharger base.

The sub-base is provided with an upper surface adapted to receive and support the discharger base thereon and is further provided with a lower surface adapted to be attached or secured to the skin of the aircraft. In order to avoid the expensive and relatively undesirable techniques of bonding the mounting structure or sub-base to the composite material with a silver loaded epoxy or with titanium rivets, the sub-base or mounting structure of the present invention is provided with a plurality of downwardly or outwardly extending projections which terminate in relatively sharp points so that when the sub-base is clamped in place on the aircraft skin, the projections form high pressure discrete contact regions with the composite surfaces making good electrical contact with the aircraft. This construction therefore permits the employment of conventional non-conductive epoxy materials between the sub-base and the aircraft for binding the sub-base substantially permanently into desired position, so that the static discharger of this invention may be mounted thereon, and when necessary, may be removed and replaced without disturbing the sub-base.

A further feature and advantage of the present invention is the fact that the discharger itself utilizes a powdered aluminum lightning diverter strip on one surface thereof, and the discharger base as well as the sub-base have a coating of powdered aluminum on the outer surface thereof, and bonded by a suitable epoxy thereto. The powdered aluminum outer surfaces consist of a peppering of aluminum oxide powder on the outer surfaces. In the event of a lightning strike, or attachment, the powdered aluminum provides a broad path over which the plasma may flow to the exterior surfaces of the discharger shank or base section, which flash over the sub-base and to the composite aircraft material thereunder, thereby spreading out the energy, and tending to minimize any damage to the underlying graphite and/or boron composite material surrounding the discharger.

It is accordingly an important object of this invention to provide a discharger and mounting arrangement, as described above, which eliminates corrosion at the mounting surface which may otherwise occur between an aluminum discharger base and a composite airframe surface.

Another object of the invention is the provision of a discharger mounting base structure and a discharger for use therewith, for graphite composite aircraft surfaces.

A still further object of this invetion is to provide a static discharger mounting arrangement which provides for the flow of energy outwardly therefrom, in the event of a lightning attachment, and minimize damage to the underlying aircraft surface.

Another object is the provision of a novel discharger and mounting base adapted for use with graphite composite aircraft surfaces, providing for the attachment of the mounting structure to the aircraft with conventional non-conductive epoxy.

These and other objects and advantages of the invention will be apparent from the following description, the accompanying drawings and the appended claims.

BRIEF DESCRIPTION OF THE DRAWINGS

FIG. 1 is a side elevation of a discharger, discharger base and sub-base made in accordance with this invention;

FIG. 2 is a top elevation of the discharger of FIG. 1;

FIG. 3 is a sectional exploded view through the discharger base and the sub-base, showing a portion of the underlying graphite composite aircraft skin;

FIG. 4 is an enlarged fragmentary detail of one of the protuberances;

FIG. 5 is a top plan view of the sub-base; and

FIG. 6 is a bottom plan view thereof.

DESCRIPTION OF THE PREFERRED EMBODIMENT

An aircraft static discharger made in accordance with this invention is illustrated generally at 10 in FIG. 1 as including an outwardly extending elongated hollow nylon body 12 which may be made as shown in the aforementioned patent of Cline. Such discharger includes an internal conductive rod, not shown, electrically connected to transversely disposed discharge pins as described in the Cline patent. The inner end of the nylon body 12 is secured to a mounting base 20 by a transversely oriented roll pin 22.

In the above-mentioned patent of Cline, the mounting base is described as being formed of aluminum. In the present invention, the base 20 is formed exclusively of a conductive non-metallic material such as a 40% carbon fiber fortified nylon. Preferably the base is injection molded from such material.

The base 20 is secured by hexagonal cap screws 23 to an interfitting intermediate or sub-base 30. Sub-base 30, as shown in section in FIG. 3, is fitted between the base 20 and the underlying graphite composite aircraft skin or surface 32, and forms the mounting attachment for the discharger 10. The sub-base is preferably formed of the same non-metallic conductive material as that of the base 20, and is provided with an upper surface 33 which mates with a lower mounting surface 34 of the base 20. Preferably, the sub-base 30 is provided with a pair of upwardly extending truncated conical projections 35 which are received within suitable conically tapered openings 36 formed in the lower surface 34, and retained thereby by the screws 23. The screws 23 are manufactured from an insulated material or from a metallic material, such as stainless steel, with an insulated coating such as Teflon on the entire screw to isolate said metal screw from the graphite or carbon used in the bore assembly.

The base 30 is further provided with means for making physical and electrical contact with the graphite composite skin 32 in form of a plurality of outwardly extending projections or protuberances 40, as shown best in FIGS. 4 and 6. The protuberances 40 terminate in relatively sharp ends or points 42. The nylon material of the sub-base 30 is somewhat softer than the underlying aircraft composite material 32 so that when the base 30 is clamped to the aircraft skin the points 42 flatten somewhat and form high pressure electrical contact areas with the surface 32. Preferably, the protuberances may form small downwardly depending cones having a 30° sloping surface, as shown in FIG. 4. and a vertical length of "X" (FIG. 4), which are preferably less than 0.030" and may be in the order of 0.017".

A pair of openings 44 are provided in the sub-base 30 for receiving suitable mounting screws or rivets therethrough, as illustrated by the screws 46 in FIG. 3. The fasteners 46 may be formed of the same material as that of the screws 23. Downwardly opening recesses 47 are formed in the lower surface 34 of the base 20 for the purpose of accommodating the heads of the screws or rivets 46.

The invention includes means for directing the flow of lightning currents to the aircraft skin which may strike the discharger and to minimize damage both to the base and sub-base and to the underlying aircraft structure. For this purpose, the outer surfaces of both the base 20 and the sub-base 30 are coated with an atomizer grade of aluminum powder which is bonded to these outer surfaces by a light or thin layer of heat curable epoxy. The powdered aluminum is illustrated by the small dots 48 in FIGS. 1 and 2 and is applied only to the outer exposed surfaces. Powdered aluminum, having an aluminum oxide coating, provides a very high resistance to DC currents and thus does not adversely affect the proper operation of the static discharger. However, such a powdered aluminum surface provides a low impedance conductive surface path for lightning energy in the event of a lightning attachment to the base or to the discharger rod. The diverter body 12 is also provided with a powdered aluminum diverter strip 50 formed along the upper surface thereof, as shown in FIG. 2, in the manner taught in the above-mentioned patent of Cline. The inner end of the strip 50 terminates in close proximity to the base 20 so that the current may readily flash over from the strip 50 to the base.

The following technique has been found useful in applying the powdered aluminum. The base and sub-base are temporarily joined or connected together with the screws 23. A heat curable epoxy binder is then painted on the outer surfaces, but not on the lower surface of the sub-base. The exterior (with the exception of the lower surface of the sub-base which includes the contact points 40), will be peppered with powdered aluminum and heat cured. After curing, the excess powdered aluminum may be blown off with an air gun.

In the event of a lightning strike, the powdered aluminum coating provides a low impedance path for lightning energy to flow over the exterior surfaces of the discharger shank or base section 20 and flash-over to the sub-base 30 and spread out over the exterior surface of the underlying aircraft skin, thereby minimizing any damage to the underlying aircraft skin.

The sub-base 30 may be applied to the aircraft skin 32 by suitably buttering or coating both the bottom surface of the base and the adjacent surface of the aircraft with a suitable non-conductive epoxy (not shown) and clamping the parts together, such as by the screws 46. The protuberances 40 with the sharp points or tips make a multitude of electrical connections with the aircraft composite material. The sub-base 30 is then permanently bonded in place and the discharger base 20 with the discharger body 12 supported thereon may be mounted in position with the screws 23.

It is anticipated that the aircraft surface or skin 32 will be prepared by first removing any non-conductive epoxy coating or paint, if any, at the portion underlying the sub-base 30. The electrical contact regions formed or defined by the tips 40 provide a good electrical and mechanical bonding of the sub-base with the aircraft while providing an intermediate space for accommodating a suitable bonding epoxy.

While the form of apparatus herein described constitutes a preferred embodiment of this invention, it is to be understood that the invention is not limited to this precise form of apparatus, and that changes may be made therein without departing from the scope of the invention.

What is claimed is:

1. An aircraft static discharger mounting structure for use with graphite and/or boron composite aircraft skin surface comprising:
    a discharger having a discharger base formed of conductive non-metallic material,
    a sub-base formed of conductive, non-metallic material and having an upper surface adapted to receive and support said discharger base and having a lower surface adapted for mounting on said composite skin surface, said lower surface having means thereon defining a plurality of outwardly extending protuberances for engaging said composite aircraft skin and providing for the use of a non-conductive epoxy binding resin between said lower surface and said aircraft skin surface for supporting said sub-base in position.

2. The structure of claim 1 further comprising a coating of powdered aluminum applied to the outer surfaces of said discharger base and said sub-base so that in the event of a lightning strike the energy can flow over the exterior surfaces of the discharger base and sub-base to the aircraft skin thereby spreading out the energy and minimizing damage to the underlying composite material surrounding the static discharger.

3. The structure of claim 1 in which said base and sub-base are injection molded of carbon filled nylon.

4. The structure of claim 1 in which said protuberances are conically shaped and terminate in points having a depth which does not exceed 0.030".

5. An aircraft static discharger assembly for use on non-metallic composite aircraft skin surfaces comprising:
   an elongated discharger body having a mounting base on one end thereof,
   a lightning diverter strip formed on said body,
   said mounting base being formed of conductive plastic material,
   a sub-base adapted to receive and support said discharger mounting base thereon, said sub-base also formed of conductive plastic material and having a lower surface adapted to be received on said composite skin surface, and
   a coating of powdered aluminum on at least the exterior surfaces of said discharger mounting base and said sub-base so that lightning currents can spread out and flow thereover to said aircraft skin to minimize localized damage to said skin.

6. The discharger assembly of claim 5 further comprising means on said sub-base forming a plurality of downwardly extending protuberances terminating in relatively sharp points formed on a lower surface thereof forming high pressure electrical contact regions with said aircraft skin when said sub-base is mounted thereon providing for the use of a non-conductive bonding resin between said lower surface and said aircraft skin for supporting said sub-base and bonding the same in position.

7. The assembly of claim 5 further including non-conductive screws attaching said mounting base to said sub-base.

* * * * *